US012713416B2

(12) United States Patent
Ganesan et al.

(10) Patent No.: US 12,713,416 B2
(45) Date of Patent: Aug. 18, 2026

(54) CONFIGURING A SHARED GROUP SPECIFIC BEAM

(71) Applicant: Lenovo (Singapore) Pte. Ltd., New Tech Park (SG)

(72) Inventors: Karthikeyan Ganesan, Kronberg im Taunus (DE); Ankit Bhamri, Rödermark (DE); Ali Ramadan Ali, Kraiburg am Inn (DE); Robin Thomas, Bad Nauheim (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 324 days.

(21) Appl. No.: 18/550,065

(22) PCT Filed: Mar. 10, 2022

(86) PCT No.: PCT/IB2022/052006

§ 371 (c)(1),
(2) Date: Sep. 11, 2023

(87) PCT Pub. No.: WO2022/189939

PCT Pub. Date: Sep. 15, 2022

(65) Prior Publication Data

US 2024/0155596 A1 May 9, 2024

Related U.S. Application Data

(60) Provisional application No. 63/159,352, filed on Mar. 10, 2021.

(51) Int. Cl.
*H04W 72/044* (2023.01)
*H04L 1/1812* (2023.01)
(Continued)

(52) U.S. Cl.
CPC ......... *H04W 72/046* (2013.01); *H04L 1/1812* (2013.01); *H04W 72/21* (2023.01); *H04W 72/542* (2023.01)

(58) Field of Classification Search
CPC . H04W 72/046; H04W 72/21; H04W 72/542; H04L 1/1812; H04L 1/1861;
(Continued)

(56) References Cited

U.S. PATENT DOCUMENTS

2020/0083943 A1* 3/2020 Rahman ............... H04B 7/0482
2021/0051681 A1* 2/2021 Manolakos ........... H04L 1/0031
(Continued)

FOREIGN PATENT DOCUMENTS

EP 3079382 A1 10/2016
EP 3361818 A1 8/2018
(Continued)

OTHER PUBLICATIONS

PCT/IB2022/052006, "International Search Report and the Written Opinion of the International Searching Authority, or the Declaration", International Searching Authority, Jul. 29, 2022, pp. 1-17.
(Continued)

*Primary Examiner* — Abdullahi Ahmed
(74) *Attorney, Agent, or Firm* — Kunzler Needham & Hilton; Bruce R. Needham

(57) ABSTRACT

Apparatuses, methods, and systems are disclosed for configuring a shared group specific beam. One method includes receiving, at a user equipment, a first configuration from a network device for a shared UE beam based on a downlink (DL) beam and an associated beam identifier (ID) that is group specific. The method includes receiving uplink control information (UCI) from the network device. The method includes receiving a second configuration from the network
(Continued)

device. The second configuration includes information for reporting to the network device.

20 Claims, 7 Drawing Sheets

(51) Int. Cl.
*H04W 72/21* (2023.01)
*H04W 72/542* (2023.01)

(58) Field of Classification Search
CPC ... H04L 1/0026; H04L 1/1671; H04L 1/1864; H04B 7/0623; H04B 7/0632; H04B 7/0658; H04B 7/066; H04B 7/0617
See application file for complete search history.

(56) References Cited

U.S. PATENT DOCUMENTS

2021/0314830 A1 10/2021 Chang et al.
2022/0014872 A1* 1/2022 Balasubramanian ........................ H04W 4/023
2022/0231742 A1* 7/2022 Subramanian .... H04W 56/0015
2024/0340048 A1* 10/2024 Luo ...................... H04B 7/0626

FOREIGN PATENT DOCUMENTS

WO 2018145225 A1 8/2018
WO 2020043298 A1 3/2020
WO 2020125479 A1 6/2020

OTHER PUBLICATIONS

Rezaie et al., "Location- and Orientation-Aided Millimeter Wave Beam Selection Using Deep Learning", IEEE International Conference on Communications, 2020, pp. 1-7.
Samsung, "Multi-beam enhancements", 3GPP TSG RAN WG1 #103-e R1-2008148, Oct. 26-Nov. 13, 2020, pp. 1-20.
Interdigital Inc., "Enhancements for M-TRP Transmission to Support HST-SFN in Rel-17", 3GPP TSG RAN WG1 #104-e R1-2100067, Jan. 25-Feb. 5, 2021, pp. 1-13.
Zte et al., "Applications of Artificial Intelligence in MIMO Networks", 3GPP TSG RAN Meeting #89e RP-201771, Sep. 14-18, 2020, pp. 1-12.
3GPP, "3rd Generation Partnership Project; Technical Specification Group Services and System Aspects; Proximity-based services (ProSe); Stage 2 (Release 16)", 3GPP TS 23.303 V16.0.0, Jul. 2020, pp. 1-130.

* cited by examiner

CONFIGURING A SHARED GROUP SPECIFIC BEAM

CROSS-REFERENCE TO RELATED APPLICATIONS

This application claims priority to U.S. Patent Application Ser. No. 63/159,352 entitled "APPARATUSES, METHODS, AND SYSTEMS FOR SIDELINK ASSISTANCE FOR UCI REPORTING TO GNB" and filed on Mar. 10, 2021 for Karthikeyan Ganesan, which is incorporated herein by reference in its entirety.

FIELD

The subject matter disclosed herein relates generally to wireless communications and more particularly relates to configuring a shared group specific beam.

BACKGROUND

In certain wireless communications networks, a number of users may be high. In such networks, system overhead may be large.

BRIEF SUMMARY

Methods for configuring a shared group specific beam are disclosed. Apparatuses and systems also perform the functions of the methods. One embodiment of a method includes receiving, at a user equipment, a first configuration from a network device for a shared UE beam based on a downlink (DL) beam and an associated beam identifier (ID) that is group specific. In some embodiments, the method includes receiving uplink control information (UCI) from the network device. In certain embodiments, the method includes receiving a second configuration from the network device. The second configuration includes information for reporting to the network device.

One apparatus for configuring a shared group specific beam includes a user equipment. In some embodiments, the apparatus includes a receiver that: receives a first configuration from a network device for a shared UE beam based on a downlink (DL) beam and an associated beam identifier (ID) that is group specific; receives uplink control information (UCI) from the network device; and receives a second configuration from the network device. The second configuration includes information for reporting to the network device.

Another embodiment of a method for configuring a shared group specific beam includes transmitting, from a network device, a first configuration to a user equipment (UE) for a shared UE beam based on a downlink (DL) beam and an associated beam identifier (ID) that is group specific. In some embodiments, the method includes transmitting uplink control information (UCI) to the UE. In certain embodiments, the method includes transmitting a second configuration to the UE. The second configuration includes information for reporting to the network device.

Another apparatus for configuring a shared group specific beam includes a network device. In some embodiments, the apparatus includes a transmitter that: transmits a first configuration to a user equipment (UE) for a shared UE beam based on a downlink (DL) beam and an associated beam identifier (ID) that is group specific; transmits uplink control information (UCI) to the UE; and transmits a second configuration to the UE. The second configuration includes information for reporting to the network device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
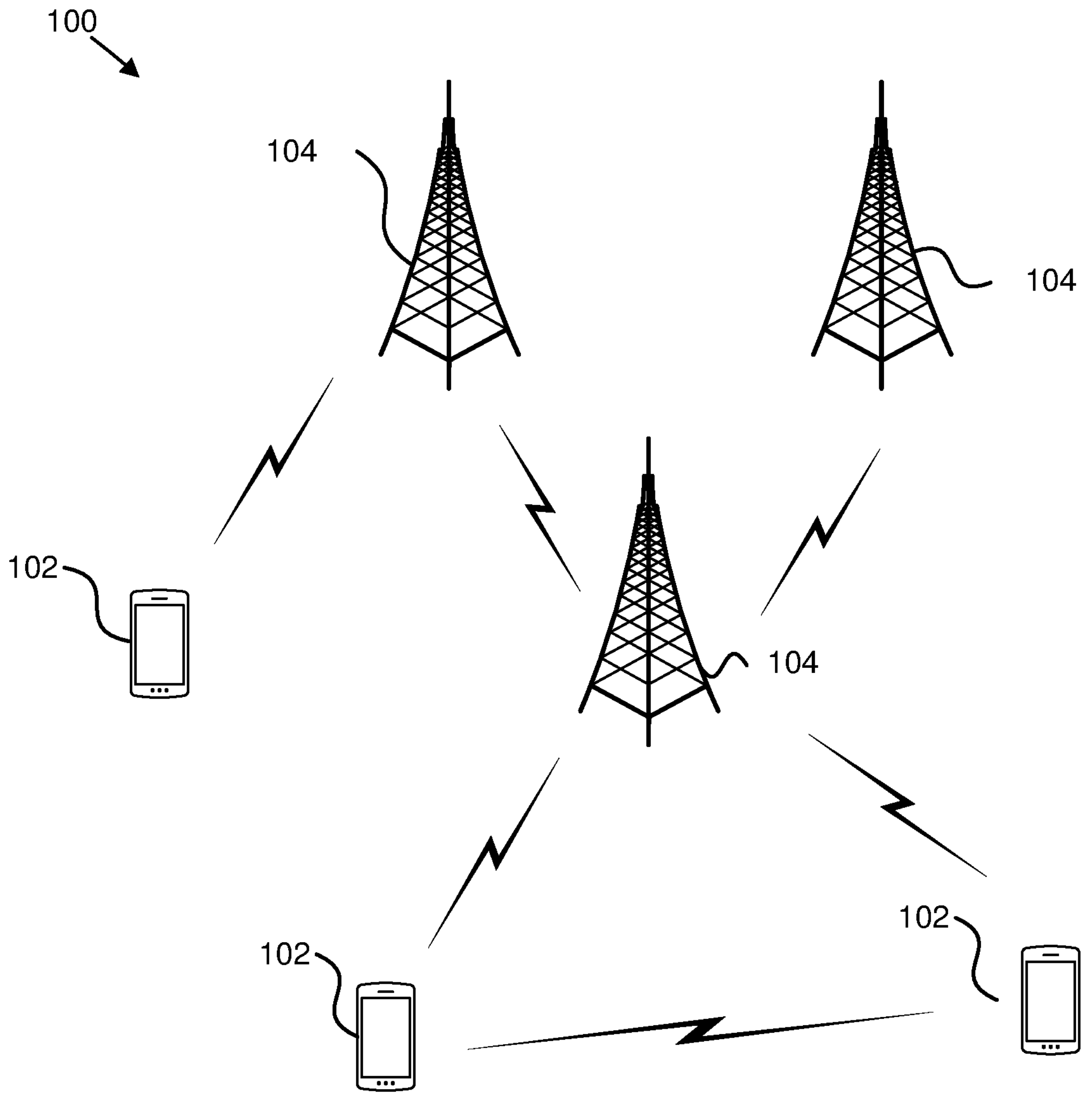
FIG. 1 is a schematic block diagram illustrating one embodiment of a wireless communication system for configuring a shared group specific beam.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for configuring a shared group specific beam. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive, at a user equipment, a first configuration from a network device for a shared UE beam based on a downlink (DL) beam and an associated beam identifier (ID) that is group specific. In some embodiments, the remote unit 102 may receive uplink control information (UCI) from the network device. In certain embodiments, the remote unit 102 may receive a second configuration from the network device. The second configuration includes information for reporting to the network device. Accordingly, the remote unit 102 may be used for configuring a shared group specific beam.

In certain embodiments, a network unit 104 may transmit, from a network device, a first configuration to a user equipment (UE) for a shared UE beam based on a downlink (DL) beam and an associated beam identifier (ID) that is group specific. In some embodiments, the network unit 104 may transmit uplink control information (UCI) to the UE. In certain embodiments, the network unit 104 may transmit a second configuration to the UE. The second configuration includes information for reporting to the network device. Accordingly, the network unit 104 may be used for configuring a shared group specific beam.

Figure 2:
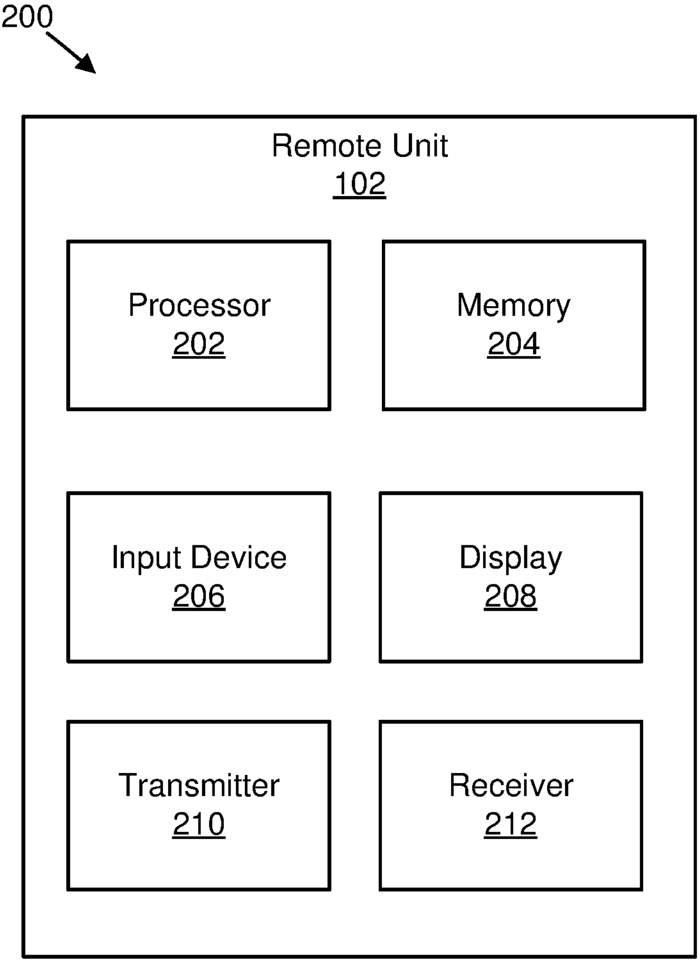
FIG. 2 is a schematic block diagram illustrating one embodiment of an apparatus that may be used for configuring a shared group specific beam.

FIG. 2 depicts one embodiment of an apparatus 200 that may be used for configuring a shared group specific beam. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the receiver 212: receives a first configuration from a network device for a shared UE beam based on a downlink (DL) beam and an associated beam identifier (ID) that is group specific; receives uplink control information (UCI) from the network device; and receives a second configuration from the network device. The second configuration includes information for reporting to the network device.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
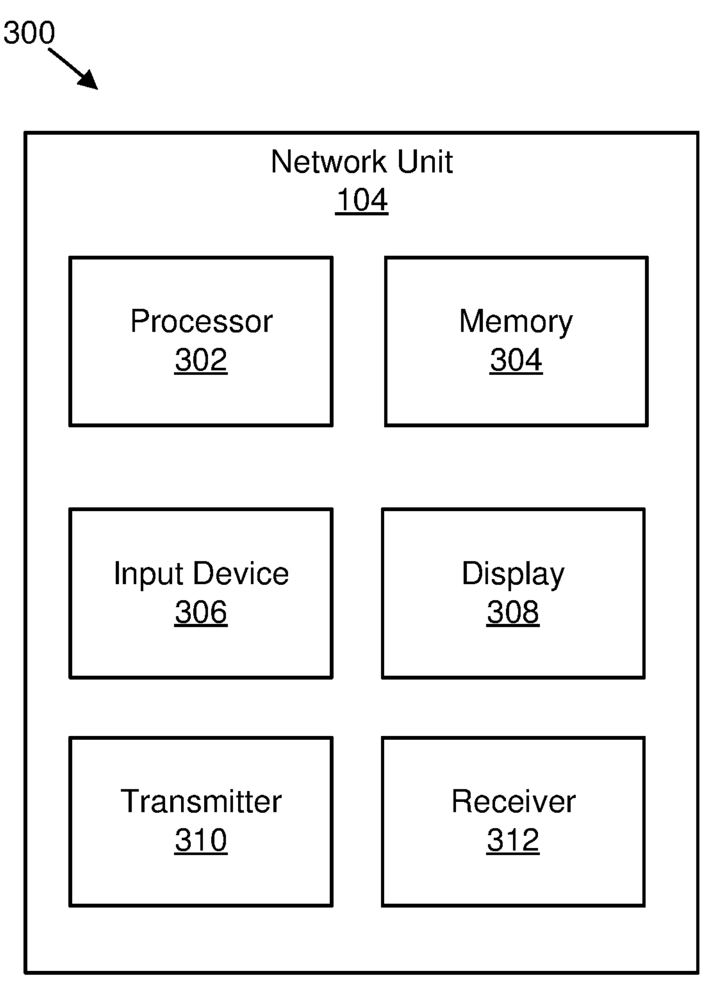
FIG. 3 is a schematic block diagram illustrating one embodiment of an apparatus that may be used for configuring a shared group specific beam.

FIG. 3 depicts one embodiment of an apparatus 300 that may be used for configuring a shared group specific beam. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310: transmits a first configuration to a user equipment (UE) for a shared UE beam based on a downlink (DL) beam and an associated beam identifier (ID) that is group specific; transmits uplink control information (UCI) to the UE; and transmits a second configuration to the UE. The second configuration includes information for reporting to the network device.

It should be noted that two or more embodiments described herein may be combined. In certain embodiments, beam-management procedures include initial beam acquisition, beam training, beam refinement, and beam failure recovery and may rely heavily on a constant and/or periodic exchange of reference signals and corresponding measurement reporting between a network and a user equipment ("UE") for both UL and DL control and/or data channel transmissions. In such embodiments, latency and overhead involved may be high. Moreover, for higher frequency ranges where beams are narrow latency and overhead may be even higher. In some embodiments, beam-dwelling time, channel state information ("CSI") reference signal ("RS") ("CSI-RS") overhead, and CSI reporting overhead for deployment scenarios with a higher number of users and a high user mobility (e.g., relative), overhead may be large.

In various embodiments, considering assistance from a sidelink ("SL") interface: 1) CSI reporting overhead considering SL assistance may be reduced; 2) in multicast, uplink control information ("UCI") (e.g., hybrid automatic repeat request ("HARQ") acknowledgment ("ACK") and/or non-acknowledgement ("NACK") ("ACK/NACK")) overhead for physical uplink control channel ("PUCCH") reporting to a gNB may be reduced; and/or 3) a reliability of downlink ("DL") multi-modal base station ("MBS") data with SL assistance may be increased.

In certain embodiments, the following terminology may be used, but, in other embodiments, the terminology may have different meanings: 1) beam category group: a beam category group is a group of UEs that have reported similar beam characteristics such as 3 dB beamwidth, antenna virtualization for a receiver ("RX") beam, and/or beam shape information; 2) reference line: a reference line is the shortest line between a gNB and UEs for a given location (e.g., can be also referred to as line-of-sight) that is defined for a location to give a common reference to all UEs for determining a relative orientation of RxXbeams; 3) virtual reference line: a virtual reference line is the shortest line between an indicated location coordinate by a gNB and a UE's location coordinate for a given location; 4) shared reference UE RX beam: a shared reference UE RX beam is the first beam determined for a UE in terms of orientation with respect to the reference line, where the orientation is calculated at the gNB based on measurement of at least one DL RS—a shared reference UE RX beam needs to be determined only once for a UE for a beam category group; 5) shared UE RX beams: shared UE RX beams are configured with a transmission to a UE in terms of relative orientation with respect to a shared reference UE RX beam—shared UE RX beams may be configured with a transmission to a UE only after the shared reference UE RX beam is determined for that UE—no measurements are needed to configure the shared UE RX beams for a UE as they are simply derived based on a relative orientation to a shared reference UE RX beam; 6) shared UE RX beam identifiers ("IDs"): shared UE RX beam IDs are assigned to shared UE RX beams that are common across all the UEs belonging to the same beam category group—a shared UE RX beam ID corresponds to the same beam orientation (and characteristics) for all the UEs in the same beam category group; and/or 7) shared DL reference signal ("RS") (e.g., beam): shared DL RS is a common downlink reference signal such as a shared CSI-RS that can be configured with a transmission to multiple UEs and associated with one or more shared UE RX beam IDs for indicating which RX beams can be used to receive the DL RS at a UE. A shared DL RS associated with shared UE Rx beam IDs can be used to allow shared measurements across multiple UEs belong to a same beam category group.

In various embodiments, details on sidelink assistance compress CSI report transmission to a gNB based on measurement of a common or shared beam based on a DL CSI-RS or a synchronization signal block ("SSB") across multiple UEs belonging to a same group. Such embodiments include information about corresponding CSI report configuration including reportQuantity and/or reportsize (e.g., resource configuration). In such embodiments, there may be compressing a channel quality information ("CQI") report transmitted to a gNB and ACK/NACK reporting to the gNB for multicast data.

In a first embodiment, there may be SL assistance for CSI reporting to a UE to network ("Uu") interface. In the first embodiment, the UE may be configured with one or more DL CSI-RS and/or SSB sets that are common or shared across multiple UEs belonging to a same group. This may be configured using a dedicated radio resource control ("RRC") configuration or using group common downlink control information ("DCI") transmitted to multiple UEs in the group. However, a quasi-co-location ("QCL") assumption of DL CSI-RS may correspond to a shared and/or common beam ID (e.g., same beam for all UEs).

According to the first embodiment, one UE from multiple UEs belonging to a group may be configured by a gNB as a primary UE (e.g., lead UE and/or group head) and signaling to indicate which UE is the primary UE among a group of UEs may be performed dynamically or semi-statically using a dedicated RRC signaling or by a medium access control ("MAC") control element ("CE"). For example, the primary UE is selected based on allocated UL resource blocks ("RBs") such as a UE configured with a high number of UL RBs for a physical uplink shared channel ("PUSCH") and/or physical uplink control channel ("PUCCH") may be selected as the primary UE. Other factors of selecting the primary UE may include a UL channel quality. In certain embodiments, a group may be configured by: 1) higher-layers (e.g., application layer with associated group member IDs); and/or 2) discovery methods which can follow different modeling mechanisms.

In certain embodiments, a primary UE can be configured to report group members CSI reports to a gNB by measuring a shared and/or common DL CSI-RS and/or SSB ("CSI-RS/SSB") beam and sidelink assistance may be used to exchange and/or transmit a CSI report estimated by each group member UEs based on a shared DL CSI-RS/SSB beam transmitted to the primary UE. Group member UEs may measure the shared and/or common DL CSI-RS/SSB beam for the transmission of a CSI report using sidelink to the primary UE which may include layer 1 ("L1") reference signal received power ("RSRP") ("L1-RSRP"), L1 signal-to-interference and noise ("SINR") ("L1-SINR"), precoder matrix indicator ("PMI"), rank indicator ("RI"), and/or CSI-RS resource index ("CRI"). Based on the received CSI report from group member UEs, the primary UE, in one example, could prepare an aggregated CSI report from each group member UE, a differential CSI report, and/or an averaged CSI report which could be semi-statically configured by RRC as part of a CSI-ReportConfig. The primary UE could be configured with a dedicated PUCCH and/or PUSCH resource for the transmission of a group CSI report to a gNB. In another implementation, if the UL resources of the primary UE are not enough to carry the reports of all the UEs in the group, the primary UE prioritizes the reports from UEs with an ultra-reliable low-latency communication ("URLLC") service then the UEs with enhanced mobile broadband ("eMBB") services. The group members may send an indication of their service along with their CSI report.

In some embodiments, all group member UEs may be configured to report the same and/or similar CSI report by configuring CSI-ReportConfig with the same and/or similar reportQuantity and/or reportsize. In one implementation, a primary UE may groupcast the received CSI report configuration from a gNB to group member UEs using sidelink.

In another implementation, group member UEs could be configured with a CSI-ReportConfig with higher layer parameter reportQuantity set to 'cri-RSRP' or 'ssb-index-RSRP' or 'cri-SINR', other values are not precluded. In the CSI-ReportConfig, group member UEs could be configured with a new field CSI-Report-SL, if set to '1' then the CSI report is transmitted using sidelink to primary UE. Group member UEs could be configured with a subset of allowed reportQuantity and/or reportsize that could be configured for CSI report transmission using sidelink. CSI-ReportConfig contains the source ID of primary UE and destination ID to be used in the sidelink, a physical layer ("PHY") CSI report priority value (e.g., derived from latency), a cast type (e.g., groupcast and/or unicast) to be used in sidelink, periodicity, time slot offset or maximum latency for the transmission of CSI report, and/or PUCCH resources for the primary UE. A CSI report could be configured as periodic, semi-persistent, aperiodic and then the CSI report could be configured to be transmitted using a physical sidelink shared channel ("PSFCH"), 2nd sidelink control information ("SCI"), physical sidelink feedback channel ("PSFCH"), or MAC CE and which resource could be semi-statically configured in the CSI-ReportConfig. For an aperiodic CSI report, group common DCI may be used for an aperiodic CSI request and a higher layer parameter reportTriggerSize configures the report size. Moreover, a new radio network temporary identifier ("RNTI") may be configured for this group common DCI and it includes one bit requesting transmission of a CSI report to the primary UE using sidelink.

In a further implementation, a primary UE could transmit CSI-ReportConfig that includes a reportQuantity and/or a reportsize to group member UEs using sidelink interface which could be based on a physical sidelink control channel ("PUCCH"), 2nd SCI, or PSFCH.

In another implementation, a primary UE could average a plurality of CSI reports received from group member UEs and, in one implementation, a primary UE could prepare a differential CSI report based on a CSI report received from group member UEs. Primary UE could transmit an averaged or differential CSI report to a gNB or select the CSI reports to be sent to the gNB based on group members' services if configured UL resources are not enough to carry all reports and/or compressed reports.

In a further implementation, assigning a shared and/or common beam based on a DL CSI-RS/SSB and subsequently requesting transmission of a CSI report using sidelink assistance may be used for the transmission of unicast physical downlink shared channel ("PDSCH") or multicast PDSCH.

In another implementation, in addition to the group common CSI reporting for the shared beam, a UE could be configured with a UE specific CSI report for the same shared and/or common beam based on DL CSI-RS/SSB and the UE is not expected to be configured with a similar and/or a same CSI-ReportConfig such as reportQuantity and reportsize for group common CSI and UE specific CSI.

In one implementation, in addition to group common CSI reporting for a shared beam, a UE could be configured to receive using a UE specific beam. In such a case, the UE can be configured to report similar and/or the same CSI-ReportConfig such as reportQuantity and reportsize for group common CSI and UE specific CSI.

In various embodiments, each UE in a group may be configured to report CSI report by configuring CSI-ReportConfig with different reportQuantity and/or reportsize by measuring a shared and/or common DL-CSI-RS/SSB beam. A primary UE could prepare an aggregated CSI report from each group member UE received from SL and transmit it to the gNB using PUCCH and/or PUSCH.

In certain embodiments, a CSI-ReportConfig could be configured to report a periodic, a semi-persistent, and/or an aperiodic group common CSI report using a PUSCH resource. For a periodic and/or a semi-persistent CSI report, a separate CG configuration may be configured and activated using a group common DCI. A MAC CE for activating the semi-persistent configuration for a CSI report may be multicast to group members.

In some embodiments, based on a CSI reported by a primary UE, a UE may be configured with a same subset of beams for the group member UEs having the same PMI and/or RI and, in one implementation, the UE may be configured with the same beam but different PMI and RI from each quantity.

In various embodiments, all group member UEs may be configured to report the same and/or similar wideband and/or subband CQI for the same shared and/or common beam based on DL CSI-RS/SSB using SL, a primary UE could average the CQI report or differential CQI report from each UE before transmission to the gNB as configured by RRC in the CSI report config. In one implementation, each UE in a group may be configured to report a different subband CQI for the same shared and/or common beam based on DL CSI-RS/SSB. In another implementation, a primary UE could prepare an aggregated CQI report from each UE (e.g., as configured by RRC in the CSI report config) before transmission to the gNB.

In a further implementation, group members report their CSI quantities only if there is a difference between a current measurement and a previous measurement. For example, a group member skips reporting RI if the current measurement and the previous measurement (e.g., for periodic or semi-persistent CSI-RS) gives the same RI value. In such a case, the primary UE assumes that the RI of a particular UE is the same as a previous report if not received.

In certain embodiments, a primary UE can report back measurements only for a subset of UEs within a group depending on: 1) a signal strength reported by individual UEs and a threshold configured by a network; and/or 2) a relative distance between UEs, wherein the UEs that are farther may not be considered part of the same group.

In some embodiments, there may be selective reporting for only a subset of UEs from a primary UE that implies updated group members for a shared beam framework to a network.

Figure 4:
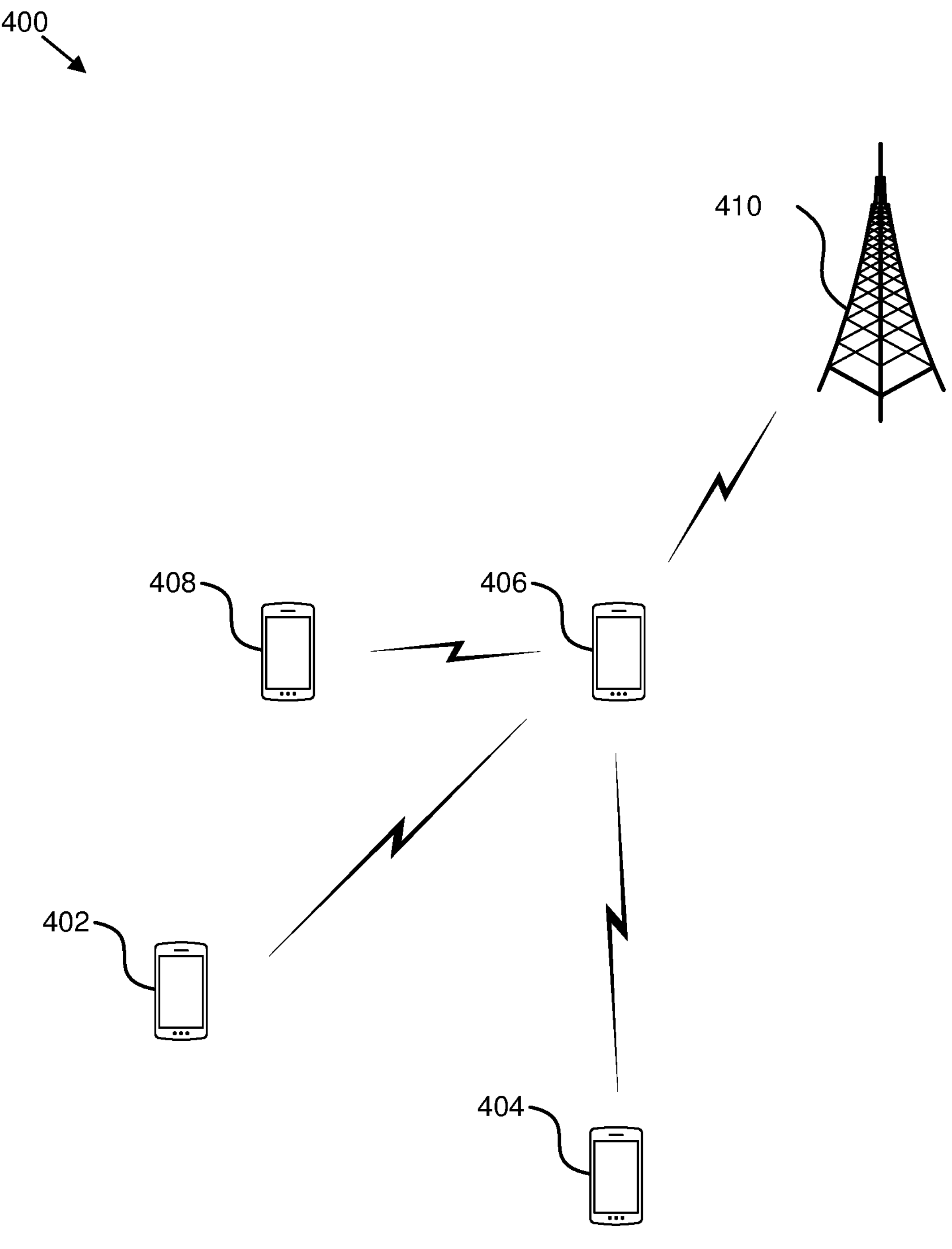
FIG. 4 is a schematic block diagram illustrating one embodiment of a system for using SL assistance for a CSI report transmission to a gNB.

FIG. 4 is a schematic block diagram illustrating one embodiment of a system 400 for using SL assistance for a CSI report transmission to a gNB. The system 400 includes a first UE 402, a second UE 404, a third UE 406 (e.g., primary UE), a fourth UE 408, and a base station 410. The first UE 402, the second UE 404, and the fourth UE 408 each transmit a CSI report to the third UE 406. The third UE 406 aggregates the CSI reports and transmits an aggregated CSI report to the base station 410.

Figure 5:
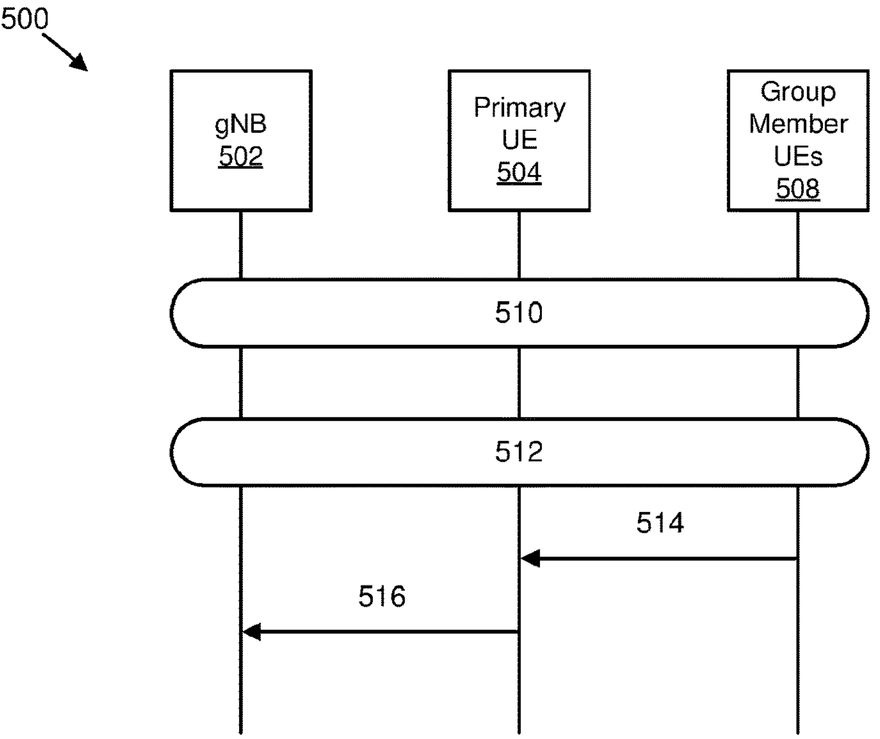
FIG. 5 is a schematic block diagram illustrating one embodiment of a system for explaining SL assistance for CSI report transmission to a gNB.

FIG. 5 is a schematic block diagram illustrating one embodiment of a system 500 for explaining SL assistance for CSI report transmission to a gNB. The system 500 includes a gNB 502, a primary UE 504, and group member UEs 508. Each of the communications in the system 500 may include one or more messages. In a first communication 510, a shared beam is communicated based on CSI-RS/SSB is transmitted to group member UEs 508. Moreover, in a second communication 512, a CSI reporting configuration is transmitted to group member UEs 508. In a third communication 514, a CSI report is transmitted using SL. Further, in a fourth communication 516, an aggregated CSI report from group member UEs 508 is transmitted by the primary UE 504 to the gNB 502.

Figure 6:
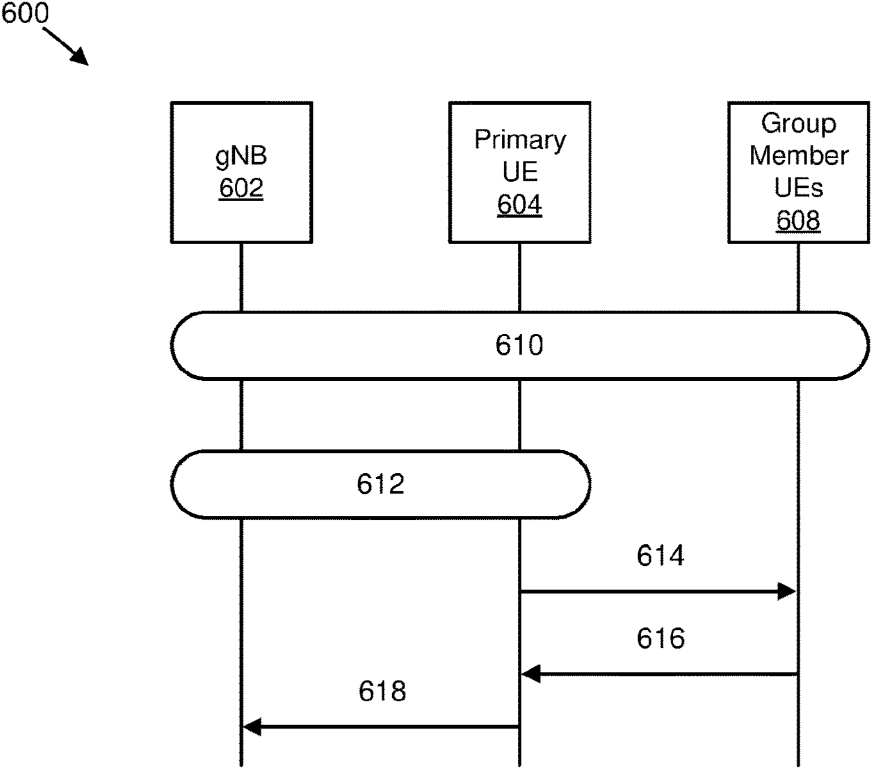
FIG. 6 is a schematic block diagram illustrating another embodiment of a system for explaining SL assistance for CSI report transmission to a gNB.

FIG. 6 is a schematic block diagram illustrating another embodiment of a system 600 for explaining SL assistance for CSI report transmission to a gNB. The system 600 includes a gNB 602, a primary UE 604, and group member UEs 608. Each of the communications in the system 600 may include one or more messages. In a first communication 610, a shared beam is communicated based on CSI-RS/SSB is transmitted to group member UEs 608. Moreover, in a second communication 612, a CSI reporting configuration is transmitted to the primary UE 604. Further, in a third communication 614, a CSI request for Uu is transmitted using SL to group member UEs 608. In a fourth communication 616, a CSI report is transmitted using SL. Further, in a fifth communication 618, an aggregated CSI report from group member UEs 608 is transmitted by the primary UE 604 to the gNB 602.

In a second embodiment, there may be group forming and/or maintenance using SL ranging. In the second embodiment, one or more SL relative ranging between a primary UE and group member UEs may be estimated using an on-demand request which could provide information regarding a relative position of each group member UE from the primary UE which is then transmitted to the gNB. The gNB could use this information further to provide a subset of beams to group member UEs, a direction of movement of each UE, a relative velocity which could then be used for validity (e.g., duration of validity) of shared and/or common beam based on DL CS-RS/SSB, a determination of movement of each UE whether it is moving in the same or different direction could assist the gNB to provide a subset of beams to UEs moving in the same direction, and/or a determination of wider beam formation.

In one implementation, a sidelink relative positioning request is transmitted to group members by the primary UE groupcasting a SL positioning reference signal ("PRS") and requesting a relative positioning measurement from the group member UEs. The group member UE provides the sidelink relative positioning measurement along with the destination ID and a RNTI (e.g., Uu identifier) which could be useful for identifying this UE by the gNB.

In another implementation, the primary UE could be configured with a positioning accuracy, a latency, a priority, a resource for SL PRS transmission and/or repetition, a SL positioning technique, a report transmission to the primary UE and then to the gNB, and so forth.

In one implementation, the primary UE can report only a sub-set of UEs and a corresponding report to the network based on a decision of valid UEs that belong to the same group based on SL ranging.

In some embodiments, a primary UE can recommend multiple groups from a set of UEs that provides a measurement report to the primary UE. A grouping hypothesis may be based on ranging between UEs. If 'N' number of UEs are within a network configured threshold in terms of relative distance, then the UE may report them as part of one group. Similarly, multiple groups may be indicated by the primary UE based on SL ranging.

According to one implementation, a gNB may configure one or more additional primary UEs using a configured candidate list based on a criteria such as signal quality, relative location estimation in an event that the current Primary UE has poor signal quality Uu or SL, and/or a radio link failure or beam failure. In such a case, a next suitable primary UE assumes the responsibility of the lead UE and/or head UE and configures and reports the CSI reports on behalf of all the group member UEs. The candidate primary UE list may also be updated and provided to all member UEs of the group.

In a third embodiment, there may be sidelink assistance to reduce ACK/NACK reporting overhead over a PUCCH. According to the third embodiment, all group member UEs transmit ACK/NACK feedback on a dedicated PSFCH resource or NACK feedback on a common PSFCH resource using sidelink to a primary UE and/or lead UE based on the reception of DL MBS transport block ("TB") and/or PDSCH TB caning multicast data.

In various embodiments, a primary UE could report ACK/NACK in a configured PUCCH resource to a gNB if the PUCCH resource is configured only for the primary UE. In one implementation, the primary UE may aggregate the HARQ ACK/NACK report from each of the group member UEs in the PUCCH or in the UCI over PUSCH.

In certain embodiments, there may be dedicated ACK/NACK (e.g., feedback type 1). In one implementation, the primary UE could report ACK in the PUCCH resource or in the UCI over PUSCH if the primary UE determines an ACK value from at least one PSFCH reception occasion from the number of PSFCH reception occasions in PSFCH resources corresponding to a PDSCH TB reception from all group member UEs, otherwise the primary UE reports NACK to the gNB.

In some embodiments, there may be a common NACK (e.g., feedback type 2). In one implementation, a primary UE could report ACK in the PUCCH resource or in the UCI over PUSCH if the primary UE determines an absence of PSFCH reception for the PSFCH reception occasion corresponding to a PDSCH TB reception from all group member UEs, otherwise the primary UE may report a NACK to the gNB.

In some embodiment, PSFCH resource is semi-statically provided by gNB to all group member UEs considering the configuration of feedback type (feedback type 1 or feedback type 2), the timegap in '1(' time slot or symbol with the reception of PDSCH and transmission of SL HARQ-ACK report, source id and the internal group member UE for implicitly deriving the cyclic shifts pairs. In another implementation, the semi-static PSFCH resource configuration by gNB could consists of frequency domain resource for each group member UE otherwise both frequency domain and cyclic shifts.

In various embodiments, a primary UE may perform retransmission of the DL MBS data and/or PDSCH TB using sidelink based on the PSFCH feedback from one or more group member UEs. There are bearer specific aspects changes while Uu bearer is used to transmit and/or receive DL MBS data and/or PDSCH TB. In this case, since the TB has already been successfully received in the Uu bearer of some UEs in a group, then the UE would need to move the corresponding protocol data convergence protocol ("PDCP") service data unit ("SDU") to the sidelink bearer to re-transmit over sidelink interface. In case of sidelink resource, a scheduling request ("SR") could be transmitted by UE to request resource for sidelink transmission. In one implementation, the gNB could semi-statically configure UE with the feature of retransmission over sidelink for MBS data. In another implementation, a one bit indicator in the DCI indicates the retransmission over sidelink, and, in a further implementation, may be implicitly derived from a PHY priority value or a logical channel ("LCH") priority value. The HARQ process may be cleared after successful transmission of data.

In certain embodiments, a group member UE could transmit a beam failure indication ("BFI") to a primary UE by measuring a shared and/or common beam and may also report a beam failure recovery ("BFR") to the primary UE. The primary UE may transmit the BFR received from one or more group members and transmit it to a gNB with their respective UE IDs. A group member UE may switch from a common and/or shared beam to a UE specific beam as part of the BFR procedure or after receiving consecutive NACKs and/or a discontinuous transmission ("DTX") and an RSRP measured from a physical downlink control channel ("PDCCH") beam is below a configured threshold.

In some embodiments, a shared and/or common beam may be applied for separately for each of DL and UL physical channels. For example, a common and/or shared beam is configured only for PDCCH and not for PDSCH. In various embodiments, a common and/or shared beam is configured only for PUSCH and not for PUCCH. In certain embodiments, a common and/or shared beam is configured only for PUSCH and not for PDSCH. In another embodiment, a common and/or shared beam may be configured with transmissions to UEs per bandwidth part ("BWP"), while an initial BWP may be configured with a UE specific beam dedicated BWP that may be configured with a common and/or shared beam. If a UE switches BWPs, it also switches a transmission configuration indicator ("TCI") table and a shared and/or common beam to a UE specific beam (and/or vice versa). In one implementation, a common and/or shared beam is configured only for a subset of panels configured in a UE, while a second subset of panels may be configured with a UE specific beam. If a UE switches a panel or activates a panel from a configured panel, the UE switches from a common and/or shared beam to the UE specific beam. In various embodiments, a UE is configured separately with a configured grant ("CG") type 1 and type 2 plurality of resources containing a common and/or shared beam and/or a UE specific beam. The UE may be reconfigured with a common beam and/or shared beam or UE specific beam using an activation DCI or RRC reconfiguration message.

Figure 7:
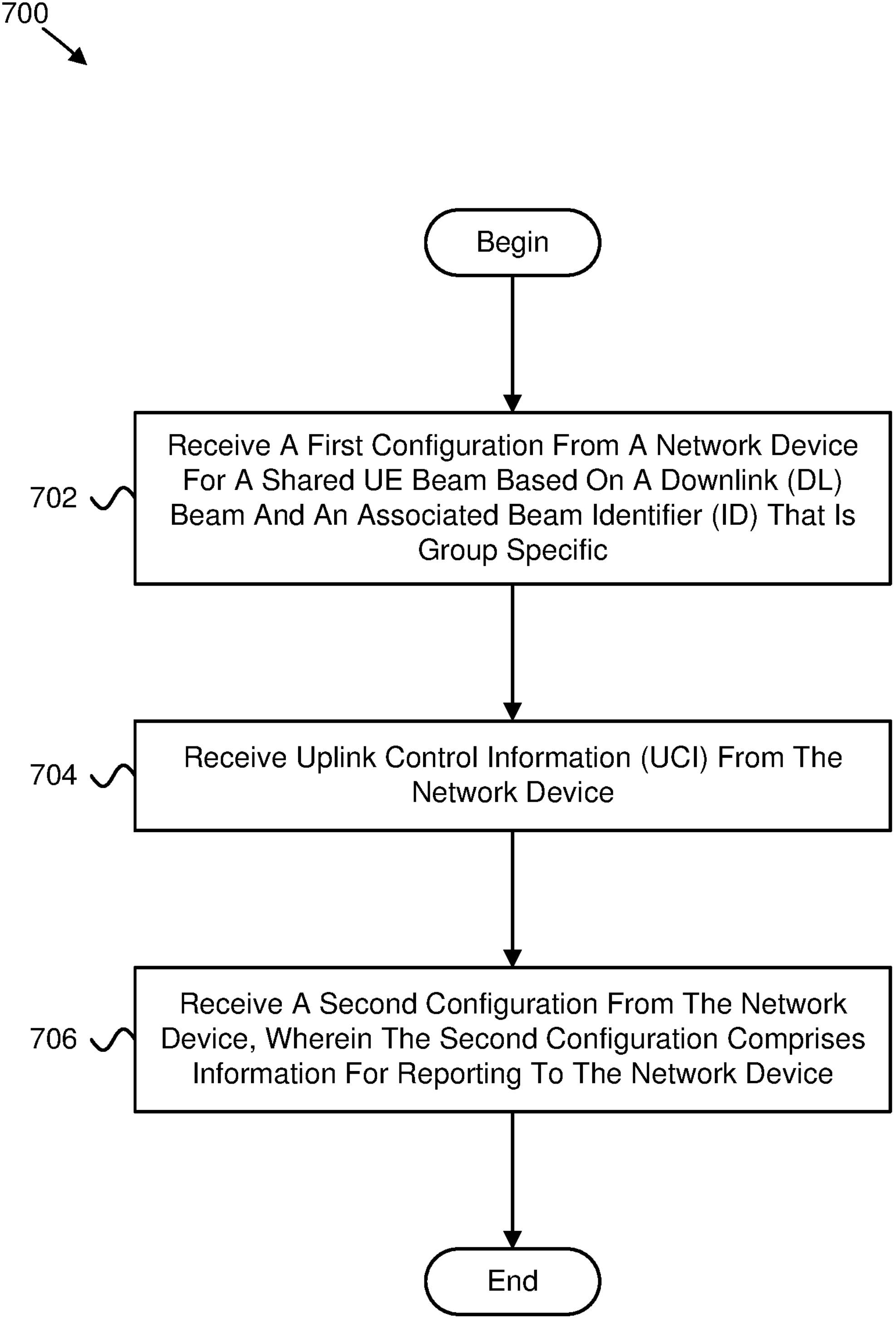
FIG. 7 is a flow chart diagram illustrating one embodiment of a method for configuring a shared group specific beam.

FIG. 7 is a flow chart diagram illustrating one embodiment of a method 700 for configuring a shared group specific beam. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

In various embodiments, the method 700 includes receiving 702, at a user equipment, a first configuration from a network device for a shared UE beam based on a downlink (DL) beam and an associated beam identifier (ID) that is group specific. In some embodiments, the method 700 includes receiving 704 uplink control information (UCI) from the network device. In certain embodiments, the method 700 includes receiving 706 a second configuration from the network device. The second configuration includes information for reporting to the network device.

In certain embodiments, the shared UE beam comprises a shared transmit beam, a shared receive beam, or a combination thereof. In some embodiments, the DL beam comprises a DL channel state information (CSI) reference signal (RS) (CSI-RS) beam, a DL synchronization signal block (SSB) beam, or a combination thereof. In various embodiments, the UCI comprises a CSI reporting configuration, hybrid automatic repeat request (HARQ) feedback configuration, or a combination thereof, and the CSI reporting configuration comprises configuration information for receiving a first CSI report using sidelink from group members, transmission of a second CSI report to the network device, or a combination thereof.

In one embodiment, the second configuration comprises an aggregated CSI report from each group member UE, a differential CSI report, an averaged CSI report from a sub-set of UEs in a group, or some combination thereof. In certain embodiments, the method 700 further comprises receiving a CSI reporting configuration from the network device, wherein the CSI reporting configuration comprises a configuration to receive a first HARQ report using sidelink from group members and transmission of a second HARQ report to the network device. In some embodiments, the method 700 further comprises receiving a CSI reporting configuration from the network device, wherein the CSI reporting configuration comprises a configuration to receive a first channel quality information (CQI) report using sidelink from group members and transmission of a second CQI report to the network device.

In various embodiments, the method 700 further comprises receiving a CSI reporting configuration comprising a common report quantity, a common report size, or a combination thereof for all group member UEs configured with the shared UE beam based on the DL beam. In one embodiment, the method 700 further comprises receiving a CSI reporting configuration comprising a different report quantity, a different report size, or a combination thereof for each group member UE of group member UEs configured with the shared UE beam based on the DL beam. In certain embodiments, the method 700 further comprises receiving a sidelink resource configuration for the transmission of a CSI report using a physical sidelink feedback channel (PSFCH), a medium access control (MAC) control element (CE), or over a physical sidelink shared channel (PSSCH).

In some embodiments, the method 700 further comprises receiving a sidelink resource configuration for the transmission of a CSI report to the network device using a physical uplink shared channel (PUSCH) or a physical uplink control channel (PUCCH). In various embodiments, the method 700 further comprises receiving a third configuration comprising information for performing a sidelink (SL) ranging technique to determine relative positioning of group member UEs from a primary UE, wherein the relative positioning is reported to the network device to determine a subset of beams, a validity of beams, a duration of beams, or some combination thereof.

In one embodiment, the method 700 further comprises receiving a fourth configuration corresponding to all group member UEs to transmit HARQ feedback on a dedicated PSFCH resource or a common PSFCH resource using sidelink communications to a primary UE based on reception of a transport block (TB) carrying multicast data. In certain embodiments, the method 700 further comprises determining retransmission of a TB using sidelink communications based on PSFCH feedback from one or more group member UEs.

Figure 8:
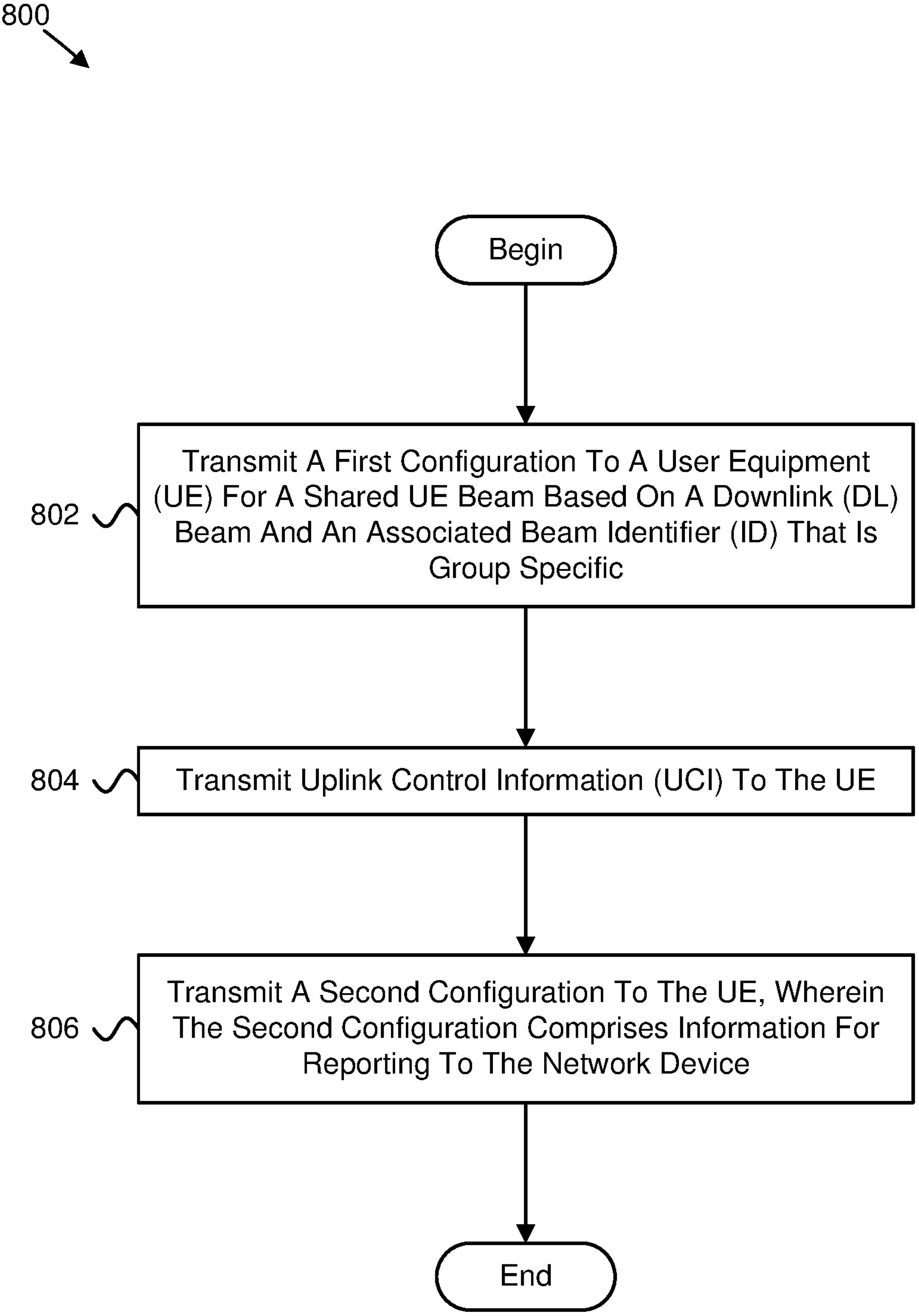
FIG. 8 is a flow chart diagram illustrating another embodiment of a method for configuring a shared group specific beam.

FIG. 8 is a flow chart diagram illustrating another embodiment of a method 800 for configuring a shared group specific beam. In some embodiments, the method 800 is performed by an apparatus, such as the network unit 104. In certain embodiments, the method 800 may be performed by a processor executing program code, for example, a microcontroller, a microprocessor, a CPU, a GPU, an auxiliary processing unit, a FPGA, or the like.

In various embodiments, the method 800 includes transmitting 802, from a network device, a first configuration to a user equipment (UE) for a shared UE beam based on a downlink (DL) beam and an associated beam identifier (ID) that is group specific. In some embodiments, the method 800 includes transmitting 804 uplink control information (UCI) to the UE. In certain embodiments, the method 800 includes transmitting 806 a second configuration to the UE. The second configuration includes information for reporting to the network device.

In certain embodiments, the shared UE beam comprises a shared transmit beam, a shared receive beam, or a combination thereof. In some embodiments, the DL beam comprises a DL channel state information (CSI) reference signal (RS) (CSI-RS) beam, a DL synchronization signal block (SSB) beam, or a combination thereof. In various embodiments, the UCI comprises a CSI reporting configuration, hybrid automatic repeat request (HARQ) feedback configuration, or a combination thereof, and the CSI reporting configuration comprises configuration information for receiving a first CSI report using sidelink from group members, transmission of a second CSI report to the network device, or a combination thereof.

In one embodiment, the second configuration comprises an aggregated CSI report from each group member UE, a differential CSI report, an averaged CSI report from a sub-set of UEs in a group, or some combination thereof. In certain embodiments, the method 800 further comprises transmitting a CSI reporting configuration to the UE, wherein the CSI reporting configuration comprises a configuration to receive a first HARQ report using sidelink from group members and transmission of a second HARQ report to the network device. In some embodiments, the method 800 further comprises transmitting a CSI reporting configuration to the UE, wherein the CSI reporting configuration comprises a configuration to receive a first channel quality information (CQI) report using sidelink from group members and transmission of a second CQI report to the network device.

In various embodiments, the method 800 further comprises transmitting a CSI reporting configuration comprising a common report quantity, a common report size, or a combination thereof for all group member UEs configured with the shared UE beam based on the DL beam. In one embodiment, the method 800 further comprises transmitting a CSI reporting configuration comprising a different report quantity, a different report size, or a combination thereof for each group member UE of group member UEs configured with the shared UE beam based on the DL beam. In certain embodiments, the method 800 further comprises transmitting a sidelink resource configuration for the transmission of a CSI report using a physical sidelink feedback channel (PSFCH), a medium access control (MAC) control element (CE), or over a physical sidelink shared channel (PSSCH).

In some embodiments, the method 800 further comprises transmitting a sidelink resource configuration for the transmission of a CSI report to the network device using a physical uplink shared channel (PUSCH) or a physical uplink control channel (PUCCH). In various embodiments, the method 800 further comprises transmitting a third configuration comprising information for performing a sidelink (SL) ranging technique to determine relative positioning of group member UEs from a primary UE, wherein the relative positioning is reported to the network device to determine a subset of beams, a validity of beams, a duration of beams, or some combination thereof. In one embodiment, the method 800 further comprises transmitting a fourth configuration corresponding to all group member UEs to transmit HARQ feedback on a dedicated PSFCH resource or a common PSFCH resource using sidelink communications to a primary UE based on reception of a transport block (TB) carrying multicast data.

In one embodiment, an apparatus comprises a user equipment (UE). The apparatus further comprises: a receiver that: receives a first configuration from a network device for a shared UE beam based on a downlink (DL) beam and an associated beam identifier (ID) that is group specific; receives uplink control information (UCI) from the network device; and receives a second configuration from the network device, wherein the second configuration comprises information for reporting to the network device.

In certain embodiments, the shared UE beam comprises a shared transmit beam, a shared receive beam, or a combination thereof.

In some embodiments, the DL beam comprises a DL channel state information (CSI) reference signal (RS) (CSI-RS) beam, a DL synchronization signal block (SSB) beam, or a combination thereof.

In various embodiments, the UCI comprises a CSI reporting configuration, hybrid automatic repeat request (HARQ) feedback configuration, or a combination thereof, and the CSI reporting configuration comprises configuration information for receiving a first CSI report using sidelink from group members, transmission of a second CSI report to the network device, or a combination thereof.

In one embodiment, the second configuration comprises an aggregated CSI report from each group member UE, a differential CSI report, an averaged CSI report from a sub-set of UEs in a group, or some combination thereof.

In certain embodiments, the receiver receives a CSI reporting configuration from the network device, and the CSI reporting configuration comprises a configuration to receive a first HARQ report using sidelink from group members and transmission of a second HARQ report to the network device.

In some embodiments, the receiver receives a CSI reporting configuration from the network device, and the CSI reporting configuration comprises a configuration to receive a first channel quality information (CQI) report using sidelink from group members and transmission of a second CQI report to the network device.

In various embodiments, the receiver receives a CSI reporting configuration comprising a common report quantity, a common report size, or a combination thereof for all group member UEs configured with the shared UE beam based on the DL beam.

In one embodiment, the receiver receives a CSI reporting configuration comprising a different report quantity, a different report size, or a combination thereof for each group member UE of group member UEs configured with the shared UE beam based on the DL beam.

In certain embodiments, the receiver receives a sidelink resource configuration for the transmission of a CSI report using a physical sidelink feedback channel (PSFCH), a medium access control (MAC) control element (CE), or over a physical sidelink shared channel (PSSCH).

In some embodiments, the receiver receives a sidelink resource configuration for the transmission of a CSI report to the network device using a physical uplink shared channel (PUSCH) or a physical uplink control channel (PUCCH).

In various embodiments, the receiver receives a third configuration comprising information for performing a sidelink (SL) ranging technique to determine relative positioning of group member UEs from a primary UE, and the relative positioning is reported to the network device to determine a subset of beams, a validity of beams, a duration of beams, or some combination thereof.

In one embodiment, the receiver receives a fourth configuration corresponding to all group member UEs to transmit HARQ feedback on a dedicated PSFCH resource or a common PSFCH resource using sidelink communications to a primary UE based on reception of a transport block (TB) carrying multicast data.

In certain embodiments, the apparatus further comprises a processor that determines retransmission of a TB using sidelink communications based on PSFCH feedback from one or more group member UEs.

In one embodiment, a method of a user equipment (UE) comprises: receiving a first configuration from a network device for a shared UE beam based on a downlink (DL) beam and an associated beam identifier (ID) that is group specific; receiving uplink control information (UCI) from the network device; and receiving a second configuration from the network device, wherein the second configuration comprises information for reporting to the network device.

In certain embodiments, the shared UE beam comprises a shared transmit beam, a shared receive beam, or a combination thereof.

In some embodiments, the DL beam comprises a DL channel state information (CSI) reference signal (RS) (CSI-RS) beam, a DL synchronization signal block (SSB) beam, or a combination thereof.

In various embodiments, the UCI comprises a CSI reporting configuration, hybrid automatic repeat request (HARQ) feedback configuration, or a combination thereof, and the CSI reporting configuration comprises configuration information for receiving a first CSI report using sidelink from group members, transmission of a second CSI report to the network device, or a combination thereof.

In one embodiment, the second configuration comprises an aggregated CSI report from each group member UE, a differential CSI report, an averaged CSI report from a sub-set of UEs in a group, or some combination thereof.

In certain embodiments, the method further comprises receiving a CSI reporting configuration from the network device, wherein the CSI reporting configuration comprises a configuration to receive a first HARQ report using sidelink from group members and transmission of a second HARQ report to the network device.

In some embodiments, the method further comprises receiving a CSI reporting configuration from the network device, wherein the CSI reporting configuration comprises a configuration to receive a first channel quality information (CQI) report using sidelink from group members and transmission of a second CQI report to the network device.

In various embodiments, the method further comprises receiving a CSI reporting configuration comprising a common report quantity, a common report size, or a combination thereof for all group member UEs configured with the shared UE beam based on the DL beam.

In one embodiment, the method further comprises receiving a CSI reporting configuration comprising a different report quantity, a different report size, or a combination thereof for each group member UE of group member UEs configured with the shared UE beam based on the DL beam.

In certain embodiments, the method further comprises receiving a sidelink resource configuration for the transmission of a CSI report using a physical sidelink feedback channel (PSFCH), a medium access control (MAC) control element (CE), or over a physical sidelink shared channel (PSFCH).

In some embodiments, the method further comprises receiving a sidelink resource configuration for the transmission of a CSI report to the network device using a physical uplink shared channel (PUSCH) or a physical uplink control channel (PUCCH).

In various embodiments, the method further comprises receiving a third configuration comprising information for performing a sidelink (SL) ranging technique to determine relative positioning of group member UEs from a primary UE, wherein the relative positioning is reported to the network device to determine a subset of beams, a validity of beams, a duration of beams, or some combination thereof.

In one embodiment, the method further comprises receiving a fourth configuration corresponding to all group member UEs to transmit HARQ feedback on a dedicated PSFCH resource or a common PSFCH resource using sidelink communications to a primary UE based on reception of a transport block (TB) carrying multicast data.

In certain embodiments, the method further comprises determining retransmission of a TB using sidelink communications based on PSFCH feedback from one or more group member UEs.

In one embodiment, an apparatus comprises a network device. The apparatus further comprises: a transmitter that: transmits a first configuration to a user equipment (UE) for a shared UE beam based on a downlink (DL) beam and an associated beam identifier (ID) that is group specific; transmits uplink control information (UCI) to the UE; and transmits a second configuration to the UE, wherein the second configuration comprises information for reporting to the network device.

In certain embodiments, the shared UE beam comprises a shared transmit beam, a shared receive beam, or a combination thereof.

In some embodiments, the DL beam comprises a DL channel state information (CSI) reference signal (RS) (CSI-RS) beam, a DL synchronization signal block (SSB) beam, or a combination thereof.

In various embodiments, the UCI comprises a CSI reporting configuration, hybrid automatic repeat request (HARQ) feedback configuration, or a combination thereof, and the CSI reporting configuration comprises configuration information for receiving a first CSI report using sidelink from group members, transmission of a second CSI report to the network device, or a combination thereof.

In one embodiment, the second configuration comprises an aggregated CSI report from each group member UE, a differential CSI report, an averaged CSI report from a sub-set of UEs in a group, or some combination thereof.

In certain embodiments, the transmitter transmits a CSI reporting configuration to the UE, and the CSI reporting configuration comprises a configuration to receive a first HARQ report using sidelink from group members and transmission of a second HARQ report to the network device.

In some embodiments, the transmitter transmits a CSI reporting configuration to the UE, and the CSI reporting configuration comprises a configuration to receive a first channel quality information (CQI) report using sidelink from group members and transmission of a second CQI report to the network device.

In various embodiments, the transmitter transmits a CSI reporting configuration comprising a common report quantity, a common report size, or a combination thereof for all group member UEs configured with the shared UE beam based on the DL beam.

In one embodiment, the transmitter transmits a CSI reporting configuration comprising a different report quantity, a different report size, or a combination thereof for each group member UE of group member UEs configured with the shared UE beam based on the DL beam.

In certain embodiments, the transmitter transmits a sidelink resource configuration for the transmission of a CSI report using a physical sidelink feedback channel (PSFCH), a medium access control (MAC) control element (CE), or over a physical sidelink shared channel (PSSCH).

In some embodiments, the transmitter transmits a sidelink resource configuration for the transmission of a CSI report to the network device using a physical uplink shared channel (PUSCH) or a physical uplink control channel (PUCCH).

In various embodiments, the transmitter transmits a third configuration comprising information for performing a sidelink (SL) ranging technique to determine relative positioning of group member UEs from a primary UE, and the relative positioning is reported to the network device to determine a subset of beams, a validity of beams, a duration of beams, or some combination thereof.

In one embodiment, the transmitter transmits a fourth configuration corresponding to all group member UEs to transmit HARQ feedback on a dedicated PSFCH resource or a common PSFCH resource using sidelink communications to a primary UE based on reception of a transport block (TB) carrying multicast data.

In one embodiment, a method of a network device comprises: transmitting a first configuration to a user equipment (UE) for a shared UE beam based on a downlink (DL) beam and an associated beam identifier (ID) that is group specific; transmitting uplink control information (UCI) to the UE; and transmitting a second configuration to the UE, wherein the second configuration comprises information for reporting to the network device.

In certain embodiments, the shared UE beam comprises a shared transmit beam, a shared receive beam, or a combination thereof.

In some embodiments, the DL beam comprises a DL channel state information (CSI) reference signal (RS) (CSI-RS) beam, a DL synchronization signal block (SSB) beam, or a combination thereof.

In various embodiments, the UCI comprises a CSI reporting configuration, hybrid automatic repeat request (HARQ) feedback configuration, or a combination thereof, and the CSI reporting configuration comprises configuration information for receiving a first CSI report using sidelink from group members, transmission of a second CSI report to the network device, or a combination thereof.

In one embodiment, the second configuration comprises an aggregated CSI report from each group member UE, a differential CSI report, an averaged CSI report from a sub-set of UEs in a group, or some combination thereof.

In certain embodiments, the method further comprises transmitting a CSI reporting configuration to the UE, wherein the CSI reporting configuration comprises a configuration to receive a first HARQ report using sidelink from group members and transmission of a second HARQ report to the network device.

In some embodiments, the method further comprises transmitting a CSI reporting configuration to the UE, wherein the CSI reporting configuration comprises a configuration to receive a first channel quality information (CQI) report using sidelink from group members and transmission of a second CQI report to the network device.

In various embodiments, the method further comprises transmitting a CSI reporting configuration comprising a common report quantity, a common report size, or a combination thereof for all group member UEs configured with the shared UE beam based on the DL beam.

In one embodiment, the method further comprises transmitting a CSI reporting configuration comprising a different report quantity, a different report size, or a combination thereof for each group member UE of group member UEs configured with the shared UE beam based on the DL beam.

In certain embodiments, the method further comprises transmitting a sidelink resource configuration for the transmission of a CSI report using a physical sidelink feedback channel (PSFCH), a medium access control (MAC) control element (CE), or over a physical sidelink shared channel (PSSCH).

In some embodiments, the method further comprises transmitting a sidelink resource configuration for the transmission of a CSI report to the network device using a physical uplink shared channel (PUSCH) or a physical uplink control channel (PUCCH).

In various embodiments, the method further comprises transmitting a third configuration comprising information for performing a sidelink (SL) ranging technique to determine relative positioning of group member UEs from a primary UE, wherein the relative positioning is reported to the network device to determine a subset of beams, a validity of beams, a duration of beams, or some combination thereof.

In one embodiment, the method further comprises transmitting a fourth configuration corresponding to all group member UEs to transmit HARQ feedback on a dedicated PSFCH resource or a common PSFCH resource using sidelink communications to a primary UE based on reception of a transport block (TB) carrying multicast data.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:

at least one memory; and at least one processor coupled with the at least one memory and configured to cause the UE to:

receive a first configuration from a network device for a shared UE beam based on a downlink (DL) beam and an associated beam identifier (ID) that is group specific;

receive a second configuration from the network device, wherein the second configuration comprises information for reporting to the network device.

2. The UE of claim 1, wherein:

the shared UE beam comprises a shared transmit beam, a shared receive beam, or a combination thereof;

the DL beam comprises a DL channel state information (CSI) reference signal (RS) (CSI-RS) beam, a DL synchronization signal block (SSB) beam, or a combination thereof;

or a combination thereof.

3. The UE of claim 1, wherein the second configuration UCI comprises a CSI reporting configuration, hybrid automatic repeat request (HARQ) feedback configuration, or a combination thereof, and the CSI reporting configuration comprises configuration information for receiving a first CSI report using sidelink from group members, transmission of a second CSI report to the network device, or a combination thereof.

4. The UE of claim 1, wherein the second configuration comprises a combined CSI report that combines a CSI report from each group member UE, a differential CSI report, an averaged CSI report from a sub-set of UEs in a group, or some combination thereof.

5. The UE of claim 1, wherein the at least one processor is configured to cause the UE to receive a CSI reporting configuration from the network device, and the CSI reporting configuration comprises a configuration to receive a first HARQ report using sidelink from group members and transmission of a second HARQ report to the network device.

6. The UE of claim 1, wherein the at least one processor is configured to cause the UE to receive a CSI reporting configuration from the network device, and the CSI reporting configuration comprises a configuration to receive a first channel quality information (CQI) report using sidelink from group members and transmission of a second CQI report to the network device.

7. The UE of claim 1, wherein the at least one processor is configured to cause the UE to receive a CSI reporting configuration comprising a common report quantity, a common report size, or a combination thereof for all group member UEs configured with the shared UE beam based on the DL beam.

8. The UE of claim 1, wherein the at least one processor is configured to cause the UE to receive a CSI reporting configuration comprising a different report quantity, a different report size, or a combination thereof for each group member UE of group member UEs configured with the shared UE beam based on the DL beam.

9. The UE of claim 1, wherein the at least one processor is configured to cause the UE to receive a sidelink resource configuration for transmission of a CSI report using a physical sidelink feedback channel (PSFCH), a medium access control (MAC) control element (CE), or over a physical sidelink shared channel (PSSCH).

10. The UE of claim 1, wherein the at least one processor is configured to cause the UE to receive a sidelink resource configuration for transmission of a CSI report to the network device using a physical uplink shared channel (PUSCH) or a physical uplink control channel (PUCCH).

11. The UE of claim 1, wherein the at least one processor is configured to cause the UE to receive a third configuration comprising information for performing a sidelink (SL) ranging technique to determine relative positioning of group member UEs from a primary UE, and the relative positioning is reported to the network device to determine a subset of beams, a validity of beams, a duration of beams, or some combination thereof.

12. The UE of claim 1, wherein the at least one processor is configured to cause the UE to receive a fourth configuration corresponding to all group member UEs to transmit HARQ feedback on a dedicated PSFCH resource or a common PSFCH resource using sidelink communications to a primary UE based on reception of a transport block (TB) carrying multicast data.

13. The UE of claim 1, wherein the at least one processor is configured to cause the UE to determine retransmission of a TB using sidelink communications based on PSFCH feedback from one or more group member UEs.

14. A processor for wireless communication, comprising:

at least one controller coupled with at least one memory and configured to cause the processor to:

receive a first configuration from a network device for a shared user equipment (UE) beam based on a downlink (DL) beam and an associated beam identifier (ID) that is group specific;

receive a second configuration from the network device, wherein the second configuration comprises information for reporting to the network device.

15. An apparatus for performing a network function, the apparatus comprising:

at least one memory; and at least one processor coupled with the at least one memory and configured to cause the apparatus to:

transmit a first configuration to a user equipment (UE) for a shared UE beam based on a downlink (DL) beam and an associated beam identifier (ID) that is group specific;

transmit a second configuration to the UE, wherein the second configuration comprises information for reporting to the apparatus.

16. A method performed by a user equipment (UE), the method comprising:

receiving a first configuration from a network device for a shared UE beam based on a downlink (DL) beam and an associated beam identifier (ID) that is group specific;

receiving a second configuration from the network device, wherein the second configuration comprises information for reporting to the network device.

17. The processor of claim 14, wherein:

the shared UE beam comprises a shared transmit beam, a shared receive beam, or a combination thereof;

the DL beam comprises a DL channel state information (CSI) reference signal (RS) (CSI-RS) beam, a DL synchronization signal block (SSB) beam, or a combination thereof;

or a combination thereof.

18. The processor of claim 14, wherein the UCI second configuration comprises a CSI reporting configuration, hybrid automatic repeat request (HARQ) feedback configuration, or a combination thereof, and the CSI reporting configuration comprises configuration information for receiving a first CSI report using sidelink from group members, transmission of a second CSI report to the network device, or a combination thereof.

19. The processor of claim 14, wherein the second configuration comprises a combined CSI report that combines a CSI report from each group member UE, a differential CSI report, an averaged CSI report from a sub-set of UEs in a group, or some combination thereof.

20. The processor of claim 14, wherein the at least one controller is configured to cause the processor to receive a CSI reporting configuration from the network device, and the CSI reporting configuration comprises a configuration to receive a first HARQ report using sidelink from group members and transmission of a second HARQ report to the network device.

* * * * *